United States Patent
Yang

(10) Patent No.: US 12,176,001 B1
(45) Date of Patent: Dec. 24, 2024

(54) VARIABLE DATA INTERLEAVE SIZES ON HARD DRIVES

(71) Applicant: Avago Technologies International Sales Pte. Limited, Singapore (SG)

(72) Inventor: Shaohua Yang, San Jose, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/361,876

(22) Filed: Jul. 30, 2023

(51) Int. Cl.
*G11B 20/12* (2006.01)

(52) U.S. Cl.
CPC .. *G11B 20/1217* (2013.01); *G11B 2020/1297* (2013.01)

(58) Field of Classification Search
CPC ............ G11B 20/1209; G11B 20/1205; G11B 20/1407; G11B 20/1866; G11B 20/1833; G11B 2020/1232; G11B 20/12; G11B 20/16
USPC ..................................................... 360/40, 48
See application file for complete search history.

(56) References Cited

U.S. PATENT DOCUMENTS

| | | | |
|---|---|---|---|
| 9,304,910 B2 * | 4/2016 | Zuo ..................... | G06F 12/0607 |
| 10,998,001 B1 * | 5/2021 | Varnica .............. | G11B 20/1866 |
| 2017/0270963 A1 * | 9/2017 | Maeto ................ | G11B 20/1833 |

* cited by examiner

*Primary Examiner* — Nabil Z Hindi
(74) *Attorney, Agent, or Firm* — King Intellectual Asset Management

(57) ABSTRACT

Improved tools and techniques for configuring a write head of a hard disk drive and/or for writing data to a hard disk drive. The write surface of a disk in the hard disk drive can be divided into multiple logical zones, with different interleave sizes for each zone. This scheme can meet latency requirements for regions closer to the center of the write surface while providing for better error rate performance in regions further away from the center of the write surface.

20 Claims, 12 Drawing Sheets

|   | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | 0 | 1 | 2 | 3 | 4 | 5 | 6 | 7 | 8 | 9 | 10 | 11 | 12 | 13 | 14 |
| 2 | 15 | 0 | 1 | 2 | 3 | 4 | 5 | 6 | 7 | 8 | 9 | 10 | 11 | 12 | 13 |
| 3 | 14 | 15 | 0 | 1 | 2 | 3 | 4 | 5 | 6 | 7 | 8 | 9 | 10 | 11 | 12 |
| 4 | 13 | 14 | 15 | 0 | 1 | 2 | 3 | 4 | 5 | 6 | 7 | 8 | 9 | 10 | 11 |
| 5 | 12 | 13 | 14 | 15 | 0 | 1 | 2 | 3 | 4 | 5 | 6 | 7 | 8 | 9 | 10 |
| 6 | 11 | 12 | 13 | 14 | 15 | 0 | 1 | 2 | 3 | 4 | 5 | 6 | 7 | 8 | 9 |
| 7 | 10 | 11 | 12 | 13 | 14 | 15 | 0 | 1 | 2 | 3 | 4 | 5 | 6 | 7 | 8 |
| 8 | 9 | 10 | 11 | 12 | 13 | 14 | 15 | 0 | 1 | 2 | 3 | 4 | 5 | 6 | 7 |
| 9 | 8 | 9 | 10 | 11 | 12 | 13 | 14 | 15 | 0 | 1 | 2 | 3 | 4 | 5 | 6 |
| 10 | 7 | 8 | 9 | 10 | 11 | 12 | 13 | 14 | 15 | 0 | 1 | 2 | 3 | 4 | 5 |
| 11 | 6 | 7 | 8 | 9 | 10 | 11 | 12 | 13 | 14 | 15 | 0 | 1 | 2 | 3 | 4 |
| 12 | 5 | 6 | 7 | 8 | 9 | 10 | 11 | 12 | 13 | 14 | 15 | 0 | 1 | 2 | 3 |
| 13 | 4 | 5 | 6 | 7 | 8 | 9 | 10 | 11 | 12 | 13 | 14 | 15 | 0 | 1 | 2 |
| 14 | 3 | 4 | 5 | 6 | 7 | 8 | 9 | 10 | 11 | 12 | 13 | 14 | 15 | 0 | 1 |
| 15 | 2 | 3 | 4 | 5 | 6 | 7 | 8 | 9 | 10 | 11 | 12 | 13 | 14 | 15 | 0 |
| 16 | 1 | 2 | 3 | 4 | 5 | 6 | 7 | 8 | 9 | 10 | 11 | 12 | 13 | 14 | 15 |

Sectors (Interleave Size) / Slices (Slice Size)

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 2 | 4 | 6 | 8 | 10 | 12 | 14 | 16 | 18 | 20 | 22 | 24 | 26 | 28 |
| 2 | 1 | 3 | 5 | 7 | 9 | 11 | 13 | 15 | 17 | 19 | 21 | 23 | 25 | 27 | 29 |
| 3 | 30 | 0 | 2 | 4 | 6 | 8 | 10 | 12 | 14 | 16 | 18 | 20 | 22 | 24 | 26 |
| 4 | 31 | 1 | 3 | 5 | 7 | 9 | 11 | 13 | 15 | 17 | 19 | 21 | 23 | 25 | 27 |
| 5 | 28 | 30 | 0 | 2 | 4 | 6 | 8 | 10 | 12 | 14 | 16 | 18 | 20 | 22 | 24 |
| 6 | 29 | 31 | 1 | 3 | 5 | 7 | 9 | 11 | 13 | 15 | 17 | 19 | 21 | 23 | 25 |
| 7 | 26 | 28 | 30 | 0 | 2 | 4 | 6 | 8 | 10 | 12 | 14 | 16 | 18 | 20 | 22 |
| 8 | 27 | 29 | 31 | 1 | 3 | 5 | 7 | 9 | 11 | 13 | 15 | 17 | 19 | 21 | 23 |
| 9 | 24 | 26 | 28 | 30 | 0 | 2 | 4 | 6 | 8 | 10 | 12 | 14 | 16 | 18 | 20 |
| 10 | 25 | 27 | 29 | 31 | 1 | 3 | 5 | 7 | 9 | 11 | 13 | 15 | 17 | 19 | 21 |
| 11 | 22 | 24 | 26 | 28 | 30 | 0 | 2 | 4 | 6 | 8 | 10 | 12 | 14 | 16 | 18 |
| 12 | 23 | 25 | 27 | 29 | 31 | 1 | 3 | 5 | 7 | 9 | 11 | 13 | 15 | 17 | 19 |
| 13 | 20 | 22 | 24 | 26 | 28 | 30 | 0 | 2 | 4 | 6 | 8 | 10 | 12 | 14 | 16 |
| 14 | 21 | 23 | 25 | 27 | 29 | 31 | 1 | 3 | 5 | 7 | 9 | 11 | 13 | 15 | 17 |
| 15 | 18 | 20 | 22 | 24 | 26 | 28 | 30 | 0 | 2 | 4 | 6 | 8 | 10 | 12 | 14 |
| 16 | 19 | 21 | 23 | 25 | 27 | 29 | 31 | 1 | 3 | 5 | 7 | 9 | 11 | 13 | 15 |
| 17 | 16 | 18 | 20 | 22 | 24 | 26 | 28 | 30 | 0 | 2 | 4 | 6 | 8 | 10 | 12 |
| 18 | 17 | 19 | 21 | 23 | 25 | 27 | 29 | 31 | 1 | 3 | 5 | 7 | 9 | 11 | 13 |
| 19 | 14 | 16 | 18 | 20 | 22 | 24 | 26 | 28 | 30 | 0 | 2 | 4 | 6 | 8 | 10 |
| 20 | 15 | 17 | 19 | 21 | 23 | 25 | 27 | 29 | 31 | 1 | 3 | 5 | 7 | 9 | 11 |
| 21 | 12 | 14 | 16 | 18 | 20 | 22 | 24 | 26 | 28 | 30 | 0 | 2 | 4 | 6 | 8 |
| 22 | 13 | 15 | 17 | 19 | 21 | 23 | 25 | 27 | 29 | 31 | 1 | 3 | 5 | 7 | 9 |
| 23 | 10 | 12 | 14 | 16 | 18 | 20 | 22 | 24 | 26 | 28 | 30 | 0 | 2 | 4 | 6 |
| 24 | 11 | 13 | 15 | 17 | 19 | 21 | 23 | 25 | 27 | 29 | 31 | 1 | 3 | 5 | 7 |
| 25 | 8 | 10 | 12 | 14 | 16 | 18 | 20 | 22 | 24 | 26 | 28 | 30 | 0 | 2 | 4 |
| 26 | 9 | 11 | 13 | 15 | 17 | 19 | 21 | 23 | 25 | 27 | 29 | 31 | 1 | 3 | 5 |
| 27 | 6 | 8 | 10 | 12 | 14 | 16 | 18 | 20 | 22 | 24 | 26 | 28 | 30 | 0 | 2 |
| 28 | 7 | 9 | 11 | 13 | 15 | 17 | 19 | 21 | 23 | 25 | 27 | 29 | 31 | 1 | 3 |
| 29 | 4 | 6 | 8 | 10 | 12 | 14 | 16 | 18 | 20 | 22 | 24 | 26 | 28 | 30 | 0 |
| 30 | 5 | 7 | 9 | 11 | 13 | 15 | 17 | 19 | 21 | 23 | 25 | 27 | 29 | 31 | 1 |
| 31 | 2 | 4 | 6 | 8 | 10 | 12 | 14 | 16 | 18 | 20 | 22 | 24 | 26 | 28 | 30 |
| 32 | 3 | 5 | 7 | 9 | 11 | 13 | 15 | 17 | 19 | 21 | 23 | 25 | 27 | 29 | 31 |

Sectors (Interleave Size) / Slices (Slice Size)

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 1 | 2 | 3 | 4 | 5 | 6 | 7 | 8 | 9 | 10 | 11 | 12 | 13 | 14 |
| 2 | 23 | 0 | 1 | 2 | 3 | 4 | 5 | 6 | 7 | 8 | 9 | 10 | 11 | 12 | 13 |
| 3 | 22 | 23 | 0 | 1 | 2 | 3 | 4 | 5 | 6 | 7 | 8 | 9 | 10 | 11 | 12 |
| 4 | 21 | 22 | 23 | 0 | 1 | 2 | 3 | 4 | 5 | 6 | 7 | 8 | 9 | 10 | 11 |
| 5 | 20 | 21 | 22 | 23 | 0 | 1 | 2 | 3 | 4 | 5 | 6 | 7 | 8 | 9 | 10 |
| 6 | 19 | 20 | 21 | 22 | 23 | 0 | 1 | 2 | 3 | 4 | 5 | 6 | 7 | 8 | 9 |
| 7 | 18 | 19 | 20 | 21 | 22 | 23 | 0 | 1 | 2 | 3 | 4 | 5 | 6 | 7 | 8 |
| 8 | 17 | 18 | 19 | 20 | 21 | 22 | 23 | 0 | 1 | 2 | 3 | 4 | 5 | 6 | 7 |
| 9 | 16 | 17 | 18 | 19 | 20 | 21 | 22 | 23 | 0 | 1 | 2 | 3 | 4 | 5 | 6 |
| 10 | 15 | 16 | 17 | 18 | 19 | 20 | 21 | 22 | 23 | 0 | 1 | 2 | 3 | 4 | 5 |
| 11 | 14 | 15 | 16 | 17 | 18 | 19 | 20 | 21 | 22 | 23 | 0 | 1 | 2 | 3 | 4 |
| 12 | 13 | 14 | 15 | 16 | 17 | 18 | 19 | 20 | 21 | 22 | 23 | 0 | 1 | 2 | 3 |
| 13 | 12 | 13 | 14 | 15 | 16 | 17 | 18 | 19 | 20 | 21 | 22 | 23 | 0 | 1 | 2 |
| 14 | 11 | 12 | 13 | 14 | 15 | 16 | 17 | 18 | 19 | 20 | 21 | 22 | 23 | 0 | 1 |
| 15 | 10 | 11 | 12 | 13 | 14 | 15 | 16 | 17 | 18 | 19 | 20 | 21 | 22 | 23 | 0 |
| 16 | 9 | 10 | 11 | 12 | 13 | 14 | 15 | 16 | 17 | 18 | 19 | 20 | 21 | 22 | 23 |
| 17 | 8 | 9 | 10 | 11 | 12 | 13 | 14 | 15 | 16 | 17 | 18 | 19 | 20 | 21 | 22 |
| 18 | 7 | 8 | 9 | 10 | 11 | 12 | 13 | 14 | 15 | 16 | 17 | 18 | 19 | 20 | 21 |
| 19 | 6 | 7 | 8 | 9 | 10 | 11 | 12 | 13 | 14 | 15 | 16 | 17 | 18 | 19 | 20 |
| 20 | 5 | 6 | 7 | 8 | 9 | 10 | 11 | 12 | 13 | 14 | 15 | 16 | 17 | 18 | 19 |
| 21 | 4 | 5 | 6 | 7 | 8 | 9 | 10 | 11 | 12 | 13 | 14 | 15 | 16 | 17 | 18 |
| 22 | 3 | 4 | 5 | 6 | 7 | 8 | 9 | 10 | 11 | 12 | 13 | 14 | 15 | 16 | 17 |
| 23 | 2 | 3 | 4 | 5 | 6 | 7 | 8 | 9 | 10 | 11 | 12 | 13 | 14 | 15 | 16 |
| 24 | 1 | 2 | 3 | 4 | 5 | 6 | 7 | 8 | 9 | 10 | 11 | 12 | 13 | 14 | 15 |

Sectors (Interleave Size) / Slices (Slice Size)

|  | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 2 | 23 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 3 | 22 | 23 | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
| 4 | 21 | 22 | 23 | 0 | 1 | 2 | 3 | 4 | 5 | 6 | 7 | 8 | 9 | 10 | 11 | 12 | 13 | 14 | 15 | 16 | 17 | 18 | 19 | 20 |
| 5 | 20 | 21 | 22 | 23 | 0 | 1 | 2 | 3 | 4 | 5 | 6 | 7 | 8 | 9 | 10 | 11 | 12 | 13 | 14 | 15 | 16 | 17 | 18 | 19 |
| 6 | 19 | 20 | 21 | 22 | 23 | 0 | 1 | 2 | 3 | 4 | 5 | 6 | 7 | 8 | 9 | 10 | 11 | 12 | 13 | 14 | 15 | 16 | 17 | 18 |
| 7 | 18 | 19 | 20 | 21 | 22 | 23 | 0 | 1 | 2 | 3 | 4 | 5 | 6 | 7 | 8 | 9 | 10 | 11 | 12 | 13 | 14 | 15 | 16 | 17 |
| 8 | 17 | 18 | 19 | 20 | 21 | 22 | 23 | 0 | 1 | 2 | 3 | 4 | 5 | 6 | 7 | 8 | 9 | 10 | 11 | 12 | 13 | 14 | 15 | 16 |
| 9 | 16 | 17 | 18 | 19 | 20 | 21 | 22 | 23 | 0 | 1 | 2 | 3 | 4 | 5 | 6 | 7 | 8 | 9 | 10 | 11 | 12 | 13 | 14 | 15 |
| 10 | 15 | 16 | 17 | 18 | 19 | 20 | 21 | 22 | 23 | 0 | 1 | 2 | 3 | 4 | 5 | 6 | 7 | 8 | 9 | 10 | 11 | 12 | 13 | 14 |
| 11 | 14 | 15 | 16 | 17 | 18 | 19 | 20 | 21 | 22 | 23 | 0 | 1 | 2 | 3 | 4 | 5 | 6 | 7 | 8 | 9 | 10 | 11 | 12 | 13 |
| 12 | 13 | 14 | 15 | 16 | 17 | 18 | 19 | 20 | 21 | 22 | 23 | 0 | 1 | 2 | 3 | 4 | 5 | 6 | 7 | 8 | 9 | 10 | 11 | 12 |
| 13 | 12 | 13 | 14 | 15 | 16 | 17 | 18 | 19 | 20 | 21 | 22 | 23 | 0 | 1 | 2 | 3 | 4 | 5 | 6 | 7 | 8 | 9 | 10 | 11 |
| 14 | 11 | 12 | 13 | 14 | 15 | 16 | 17 | 18 | 19 | 20 | 21 | 22 | 23 | 0 | 1 | 2 | 3 | 4 | 5 | 6 | 7 | 8 | 9 | 10 |
| 15 | 10 | 11 | 12 | 13 | 14 | 15 | 16 | 17 | 18 | 19 | 20 | 21 | 22 | 23 | 0 | 1 | 2 | 3 | 4 | 5 | 6 | 7 | 8 | 9 |
| 16 | 9 | 10 | 11 | 12 | 13 | 14 | 15 | 16 | 17 | 18 | 19 | 20 | 21 | 22 | 23 | 0 | 1 | 2 | 3 | 4 | 5 | 6 | 7 | 8 |
| 17 | 8 | 9 | 10 | 11 | 12 | 13 | 14 | 15 | 16 | 17 | 18 | 19 | 20 | 21 | 22 | 23 | 0 | 1 | 2 | 3 | 4 | 5 | 6 | 7 |
| 18 | 7 | 8 | 9 | 10 | 11 | 12 | 13 | 14 | 15 | 16 | 17 | 18 | 19 | 20 | 21 | 22 | 23 | 0 | 1 | 2 | 3 | 4 | 5 | 6 |
| 19 | 6 | 7 | 8 | 9 | 10 | 11 | 12 | 13 | 14 | 15 | 16 | 17 | 18 | 19 | 20 | 21 | 22 | 23 | 0 | 1 | 2 | 3 | 4 | 5 |
| 20 | 5 | 6 | 7 | 8 | 9 | 10 | 11 | 12 | 13 | 14 | 15 | 16 | 17 | 18 | 19 | 20 | 21 | 22 | 23 | 0 | 1 | 2 | 3 | 4 |
| 21 | 4 | 5 | 6 | 7 | 8 | 9 | 10 | 11 | 12 | 13 | 14 | 15 | 16 | 17 | 18 | 19 | 20 | 21 | 22 | 23 | 0 | 1 | 2 | 3 |
| 22 | 3 | 4 | 5 | 6 | 7 | 8 | 9 | 10 | 11 | 12 | 13 | 14 | 15 | 16 | 17 | 18 | 19 | 20 | 21 | 22 | 23 | 0 | 1 | 2 |
| 23 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 0 | 1 |
| 24 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 0 |

Sectors (Interleave Size) / Slices (Slice Size)

VARIABLE DATA INTERLEAVE SIZES ON HARD DRIVES

TECHNICAL FIELD

This disclosure relates generally to hard disk drives and controllers therefore, and more specifically to techniques for interleaving data on a hard disk drive.

BACKGROUND

Interleaving data sectors in hard disk drives (HDD) has been proven to improve produce error rate performance and thus areal density gain. Such a scheme breaks up clustered errors often seen on disk media and spread them into multiple user sectors (or blocks). As a result, it improves error correction power and thus improves the areal density. This scheme, however, results in a lower-than-optimal areal density across the disk: The size of the interleave toward the radial center of the drive necessarily must be relatively small to achieve acceptable levels of latency of reads and writes in that area, because the radial velocity is relatively low. On the other hand, however, the radial velocity in outer areas is much higher, allowing for potentially greater interleave sizes without compromising latency requirements. There is a need for an interleave scheme that can meet both of these goals.

BRIEF DESCRIPTION OF THE DRAWINGS

FIGS. 5A-5E illustrates various interleave scheme including block slices, in accordance with various embodiments.

DETAILED DESCRIPTION

Figure 1:
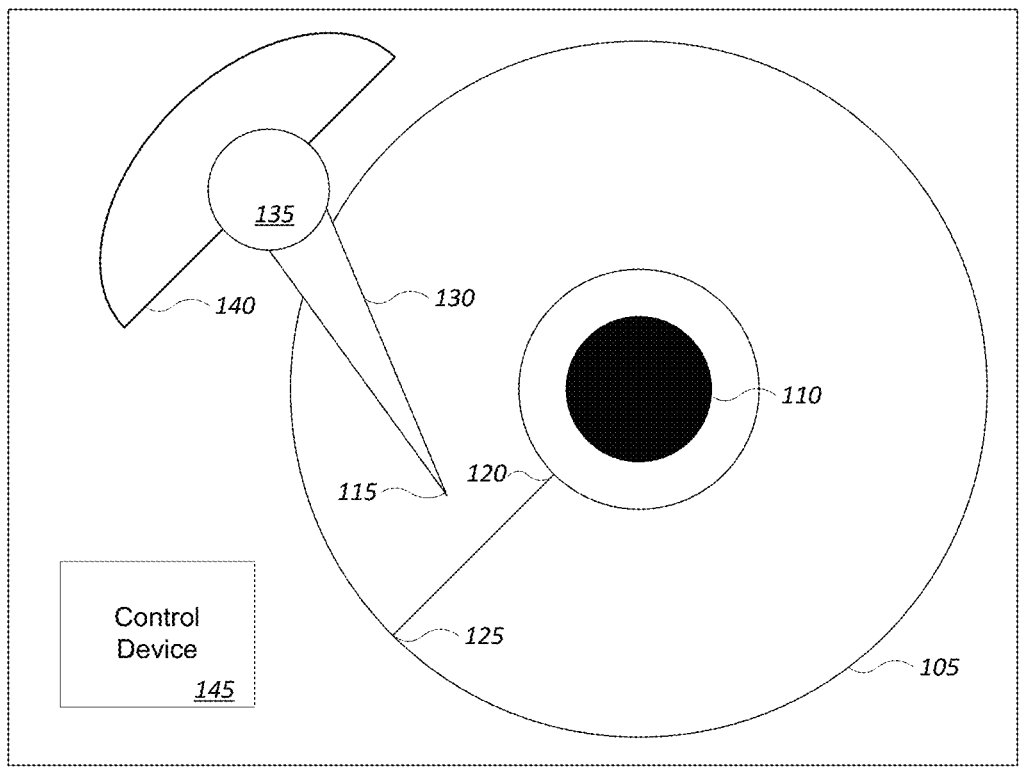
FIG. 1 is a simplified plan drawing of a hard disk drive in accordance with various embodiments.

Various embodiments provide tools and techniques to improve areal density, and consequently performance, of hard disk drives. As used herein, the term "hard disk drive" refers to a data storage device that employs one or more rotating platters ("disks"), generally coated with magnetic material, to store data using one or more magnetic heads to read and write data. Thus, as used herein, the term, "write head" means any device that is capable of writing data to a platter in a hard disk drive. FIG. 1 illustrates a simplified plan view of an exemplary hard disk drive 100, showing a single disk 105 (although there can be multiple disks 105, generally stacked vertically). The hard disk drive includes a spindle 110, which spins the disk 105, and a write head 115 (which might be part of an integrated read/write head in some embodiments) that traverses the disk 105 from an inner radius 120 to an outer radius 125. The location of the write head 115 is controlled by an actuator arm 130, which is connected to an actuator axis 135, which, in turn, is moved by an actuator 140. The hard disk drive 100 can include a control device 145.

In an aspect, the control device 145 might include logic that controls the various operations of the hard disk drive 100, including without limitation the rotation of the disk 105, the movement of the write head 115 (e.g., through the actuator 140), and the read/write activity of the write head 115. In particular embodiments, the logic can comprise hardware and/or firmware circuitry. In some cases, the circuitry might comprise an application specific integrated circuit (ASIC), a system on a chip, programmable logic (such as a field-programmable gate array (FPGA), an erasable programmable logic device (EPLD), etc.), a processor (e.g., programmed with software instructions, a microprocessor or microcontroller, and/or any other suitable device. Further examples of logic and circuitry are described below in the context of FIG. 9. While the control device 145 is shown integrated with the hard disk drive 100 in FIG. 1., this does not have to be the case; in some embodiments, the control device 145 can be separate from and/or in communication with the hard disk drive 145.

Figure 2:
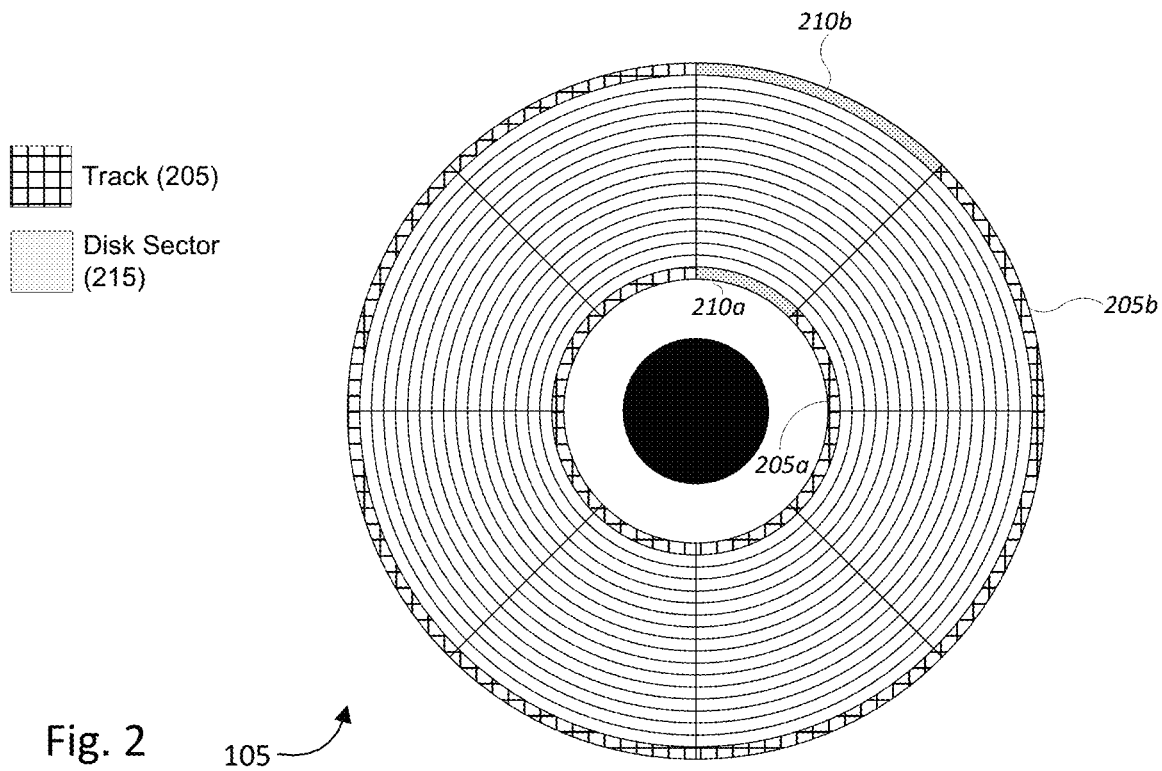
FIG. 2 illustrates a write surface of a disk, in accordance with various embodiments.

In particular embodiments, a hard drive is configured, when writing data, to interleave that data using different interleave sizes, based on the location on the disk to which the data is being written. FIG. 2 illustrates the arrangement of a typical disk 105. The write surface of the disk 105 comprises multiple concentric tracks 205 extending from a track 205a on the inner radius 120 to a track 205b on the outer radius 125. As used herein, the term "write surface" means the entire area of the disk 105 onto which data can be written, or, in some cases, the entire area on which the write head is configured to write (if less than the amount of the disk 105 on which data can be written. Each track is divided into a number of disk sectors 210 (referred to herein as a "sector"). A sector 210 generally defines the smallest unit of data that can be written to the disk 105, for example the sector 210a in track 205a and the sector 210b in track 205b. Widely used hard disk sector sizes are 512 bytes and 4 kilobytes. Note that FIG. 2B is not drawn to scale, and that in a typical disk, the sectors per track will increase from the inner tracks to the outer tracks. Thus, track 205b in the outer radius contains more sectors 210 than a track in inner radius 120 since a track in the outer radius 125 is longer. It should be appreciated that FIG. 2 is simplified for explanatory purposes, and a typical disk would have many more sectors and tracks than those illustrated by FIG. 2.

Each sector is divided into slices. The term "slice" refers to a segment data in a sector. The term "slice size" as used herein is the number of slices per sector instead of the actual size (in bytes) of a slice. It also should be appreciated that there is a direct relationship between these two values, regardless of the units used. For convenience, the term "slice size" generally is used herein to refer to the number of slices per sector, rather than the actual size in bytes of a slice, in order to describe (below) certain advantages in terms of slices per sector.

Figure 3A:
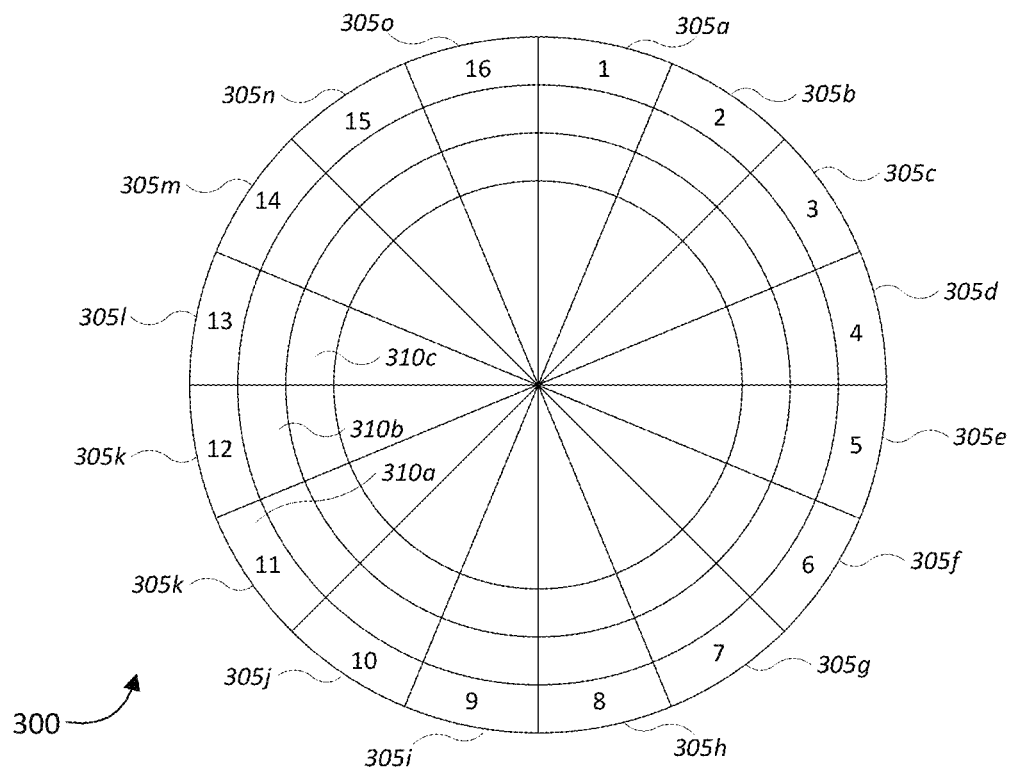
FIGS. 3A-3B illustrate different interleave schemes, in accordance with various embodiments.

As used herein, the term "interleave" refers to the process of interleaving slices of sectors when writing data to disk. To illustrate, FIG. 3A is a simplified view of a disk 300 onto which data is written in multiple sectors 305. The interleave scheme used for FIG. 3A is a 1:1 interleave (i.e., no interleave), in which whole sectors 305 are written sequentially around the track 310 (as shown by the cardinal numbers 1-16, which show the order of sectors written). Thus, sector 1 305a is written, and sector 2 305b is written immediately after, and so forth.

Figure 3B:
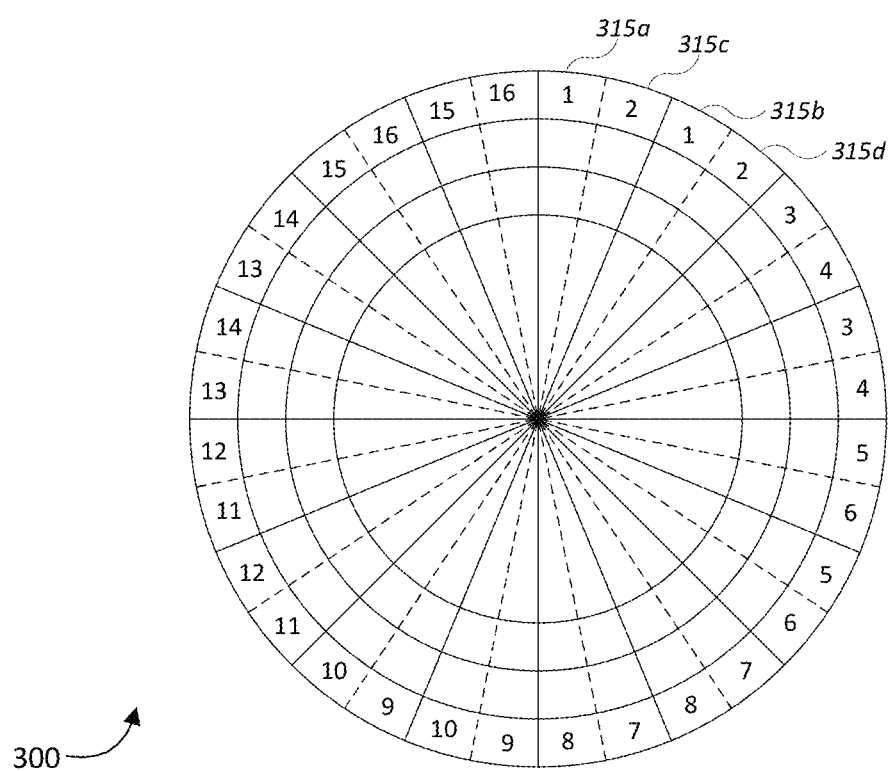

FIG. 3B illustrates the same disk 300 with a 1:2 interleave (and a slice size of 2), in which sectors are interleaved. So, for example, sectors 305 are each divided into two slices 315. A slice 315a of sector 305a is written first (rather than whole sector 305a), a slice 315b of sector 305b is written second (rather than whole sector 305b). Then, the second slice 315c of sector 305a is written, followed by the second slice 315d of sector 305b, and so forth until all slices from all sectors are written into the disk. (For readability, the remaining sectors and slices of FIG. 3B are not labeled with reference numbers, but the same principle applies).

Sector interleaving increases the sparsity of the data (as written in order), data in a sector are written at scattered locations instead of together, which avoids clustered media errors, thus improving the error rate and enhancing disk performance. As referred to herein, the term "interleave size" means the number of sectors interleaved in the scheme. Thus, for example, the scheme of FIG. 3A would have an interleave size of 1 sector (or no interleave), and the scheme of FIG. 3B would have an interleave size of 2 sectors.

Figure 4A:
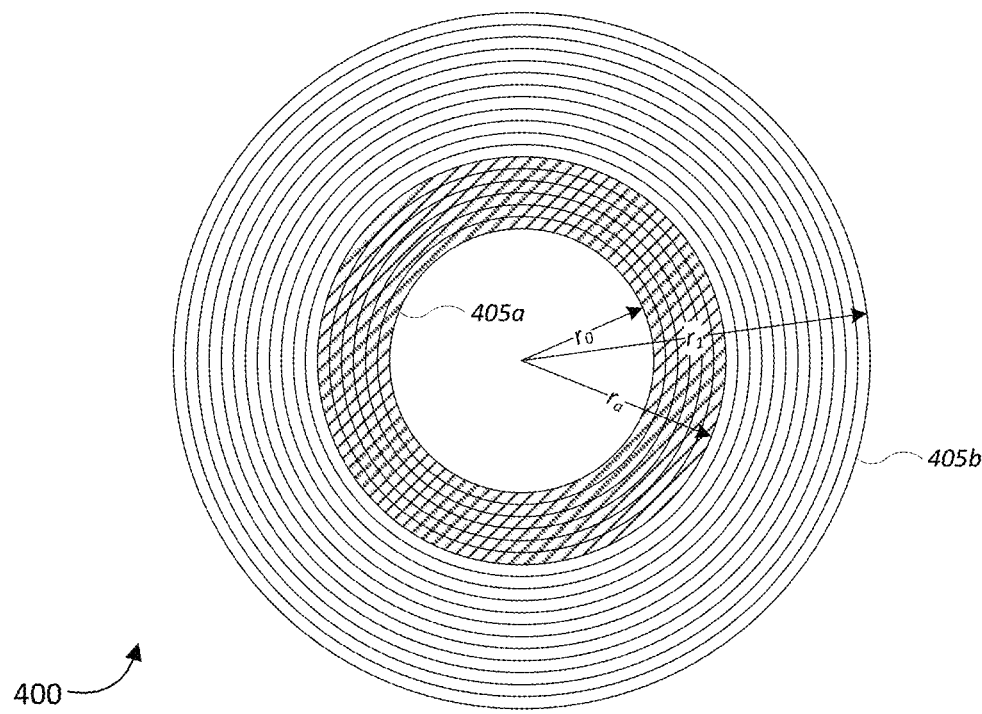
FIGS. 4A-4B show write surfaces of disks having multiple zones, in accordance with various embodiments.
Figure 4B:
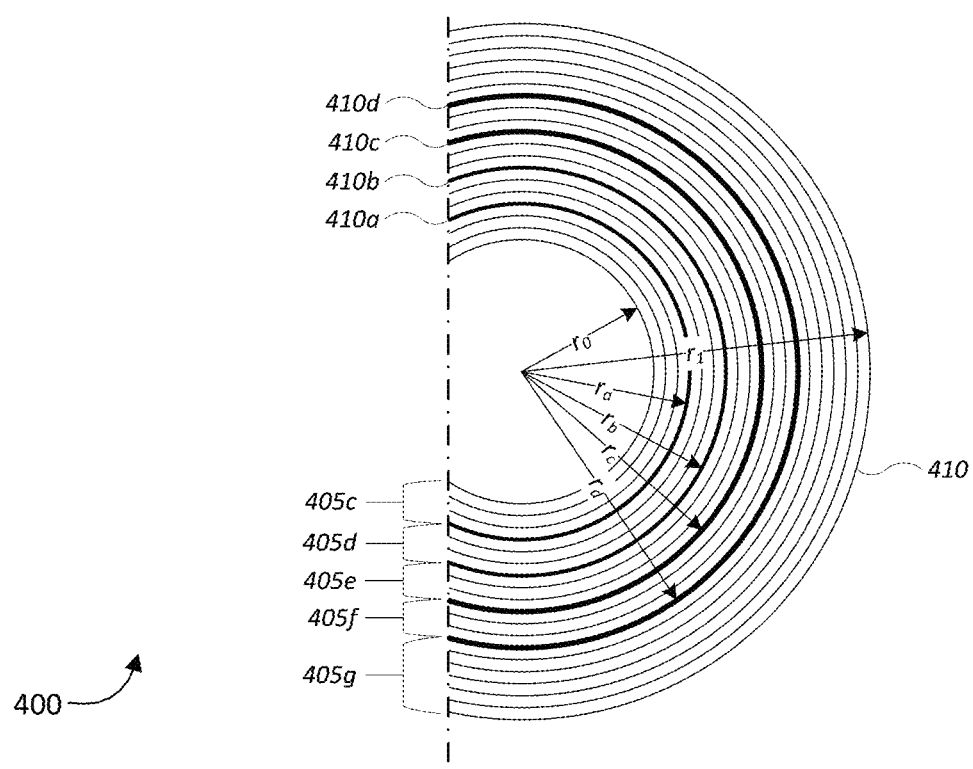

As discussed in detail below, increasing the interleave size can have a significant impact on error rate performance. Nonetheless, interleave size is often limited by latency concerns regarding the inner portion of the disk, since writing and reading an individual sector requires writing and reading the whole interleave. Certain embodiments recognize that the interleave size on outer portions of the disk has much less of an effect on hard disk drive latency, because the linear speed of the disk relative to the write head increases with the distance of the write head from the center of the disk. The linear velocity of the disk can be calculated as the product of the angular velocity of the disk (in radians/sec, revolutions per minute, etc.) multiplied by the distance from the write head to the center of the disk. Such embodiments consider the disk as a plurality of zones. FIG. 4A illustrates one example, in which the disk 400 is divided into a first (shaded) zone 405 defined as the area of the disk between an inner radius $r_o$ of the write surface of the disk and a specified radius $r_a$ and a second (unshaded) zone 410 defined as the area between $r_a$ and the outer radius $r_1$ of the write surface of the disk. FIG. 4B illustrates a section view of a disk 400 divided into five zones 405c-g, defined by the inner and outer edges of the write surface of the disk, as well as boundaries 410a-d, which correspond to radii $r_a$-$r_d$, respectively. While FIGS. 4A and 4B illustrate some examples with relatively few zones, various embodiments can employ as many zones as feasible, with a theoretical maximum number of zones being equal to the number of tracks on the disk.

According to some embodiments, the interleave size might be smaller on an inner region of the disk (i.e., a region proximal to the inner radius 120 of the disk 105 of FIG. 1, such as zone 405a in FIG. 4A), and larger on an outer region of the disk (i.e., a region proximal to the outer radius 125 of the disk 105 on FIG. 1, such as zone 405b). In other embodiments, multiple different zones might have different interleave sizes. For example, on FIG. 4B, zones 405c-g might each have a different interleave size. In some cases, the interleave size might increase (linearly or otherwise) from zone 405c, through zones 405d-f, to zone 405g, although this is not required.

Figure 5C:
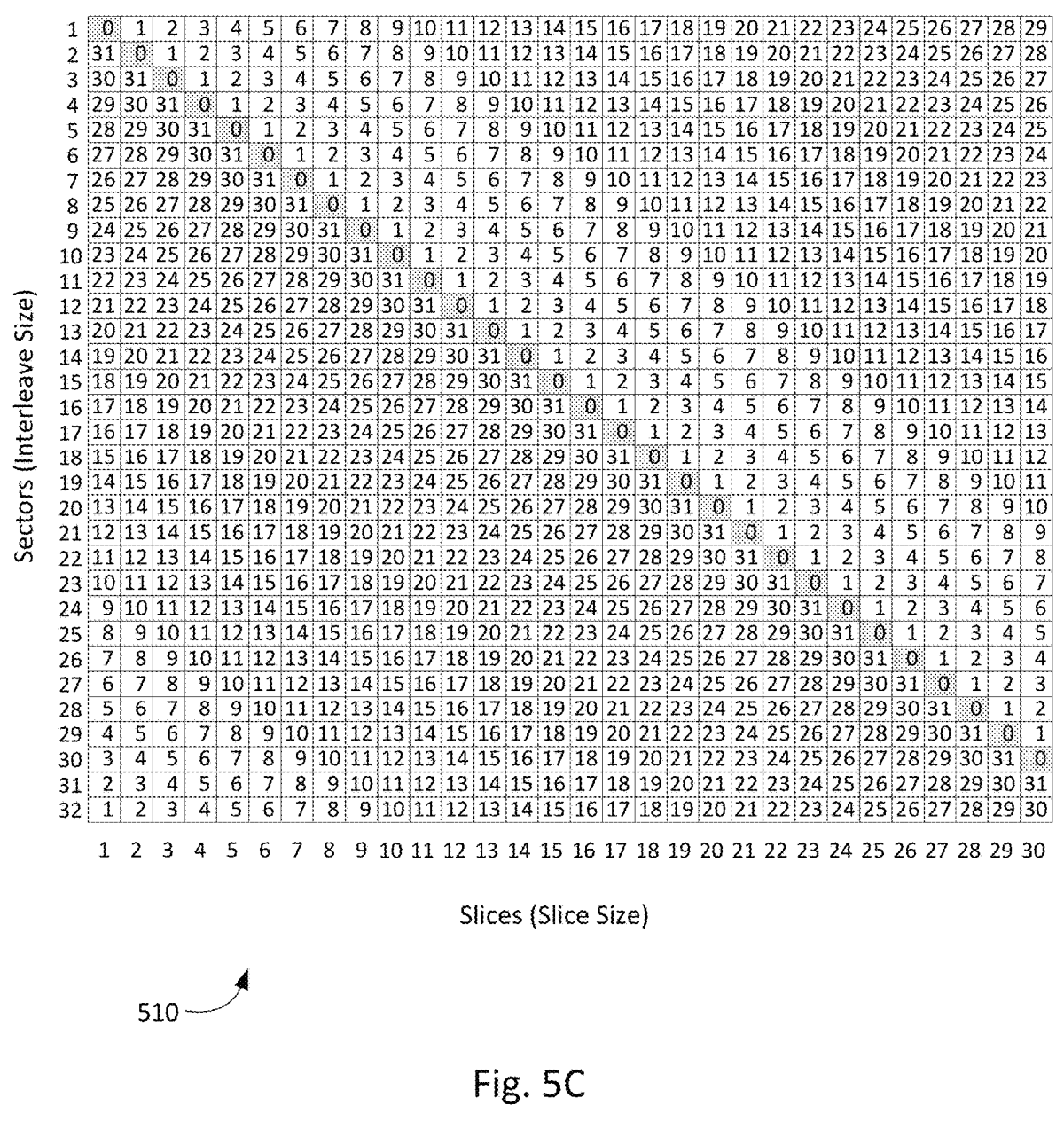

The selection of slice size can also affect the sparsity of data as written, and, correspondingly, the drive error rate performance. For example, FIGS. 5A-5E illustrate different interleave schemes with varying interleave and slice sizes. These figures help demonstrate the sparsity of the written data (as shown by the distribution of numbered data blocks (such as the data blocks with the number zero, highlighted) across the interleaved sectors and the slices thereof. FIG. 5A illustrates an interleave scheme with an interleave size of 16 sectors (shown by the vertical axis) and slice size of 15 (shown by the horizontal axis). The value in each cell represents the order of slices being written. So, for example, the data of block 0 is written with sector 1, slice 1; sector 2, slice 2; sector 3, slice 3, and so forth. After block 0, the data of block 1 is written with sector 16, slice 1; sector 1, slice 2; sector 2, slice 3, and so forth. Continue the process until the data of block 15 is written with sector 2, slice 1; sector 3, slice 2; sector 4, slice 3; and so forth. As illustrated, the sector 1 is written sparsely into data blocks 0-14. Other sectors are similarly sparsely written in the interleave. In general, a larger slice size with smaller number of bytes in each slice leads to a finer interleaving scheme that can break shorter error clusters.

A common slice size can be used for multiple interleave sizes that are equal to or slightly larger than an integer multiple of the smallest interleave size among them. For example, FIG. 5B illustrates an interleave scheme with an interleave size of 32 sectors (twice the interleave size of FIG. 5A) and slice size of 15. In this case, the data in sector 1 is written sparsely into data blocks 0-28, about twice as sparse as the example of FIG. 5A, with interleave size of 16 sectors and same slice size of 15. The error rate performance is almost as good as having a slice size of 30, which is illustrated in FIG. 5C. This is demonstrated by FIG. 6, which illustrates a chart 600 that plots the track error rate (TER) against the track pitch (TP) for the schemes of FIGS. 5A-5C, respectively. As shown, an interleave size of 32 sectors with slice size of 15 exhibits better error rate performance than an interleave size of 16, and it is almost as good as a slice size of 30. Thus, a slice size of 15 can be used for achieving the performance benefit of both interleave sizes 16 and 32. Moreover, both a lower slice size and using fewer different slice sizes overall (for different interleave sizes) can reduce circuit complexity, which is often desirable.

Figure 7:
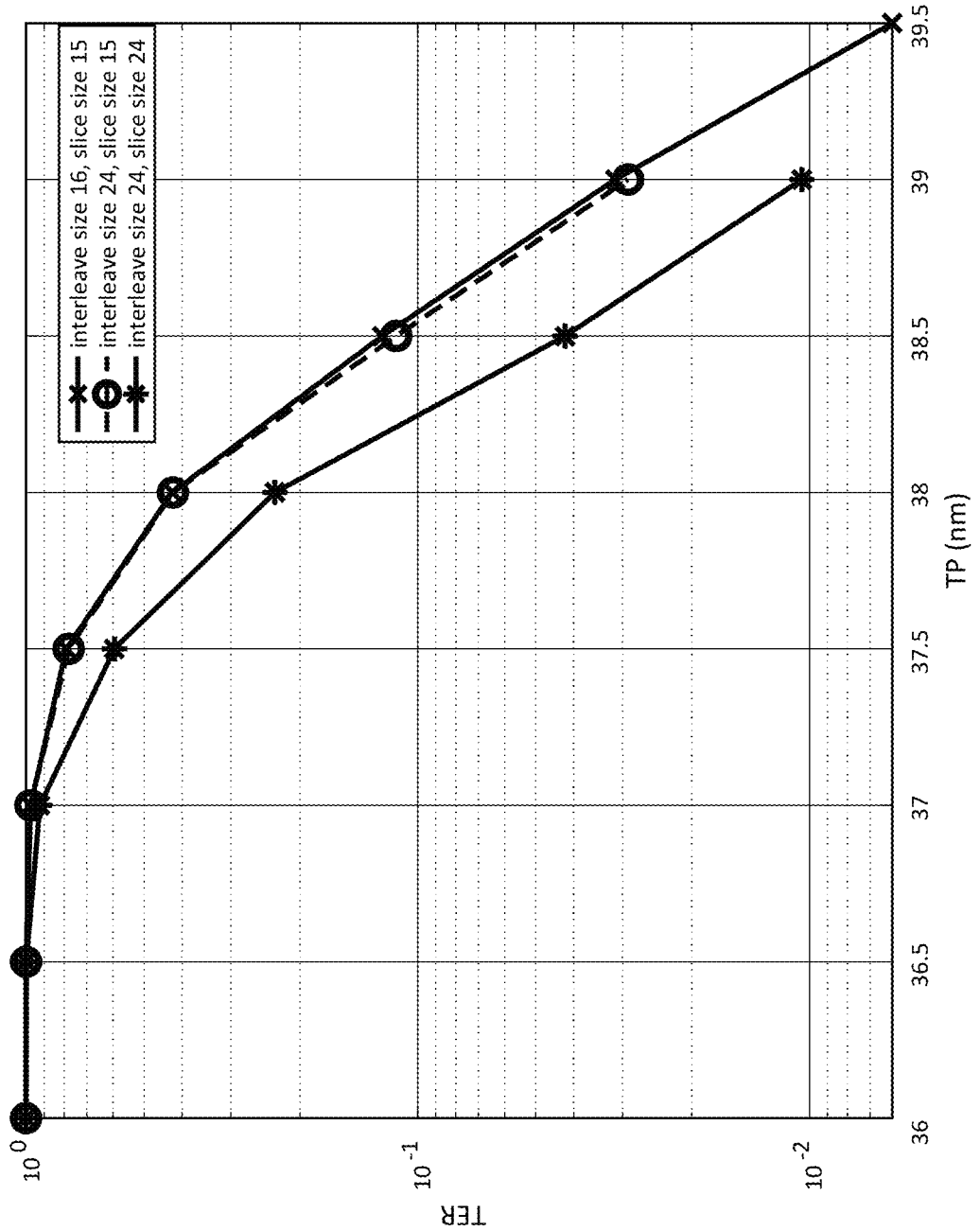

On the other hand, some embodiments can include different slice sizes for different interleave sizes. For example, FIG. 5D illustrates an interleave scheme with an interleave size of 24 sectors and slice size of 15. In this case, the data in sector 1 is written sparsely into data blocks 0-14, with much less sparsity than the whole interleave of 24 sectors. Even with a higher interleave size of 24 sectors, the slice size of 15 limits the interleave scheme error rate performance. As shown by FIG. 7, a slice size of 15 limits the data sparsity and therefore has similar error rate performance as an interleave size of 16 sectors, while a slice size of 24 (the scheme illustrated in FIG. 5E), can achieve a much better error rate performance and is thus desirable. The chart 700 of FIG. 7 illustrates that a slice size of 24 is superior to a slice size of 15 and, in some cases, can be desirable for the performance of the disk (lower TER for a given TP).

Figure 6:
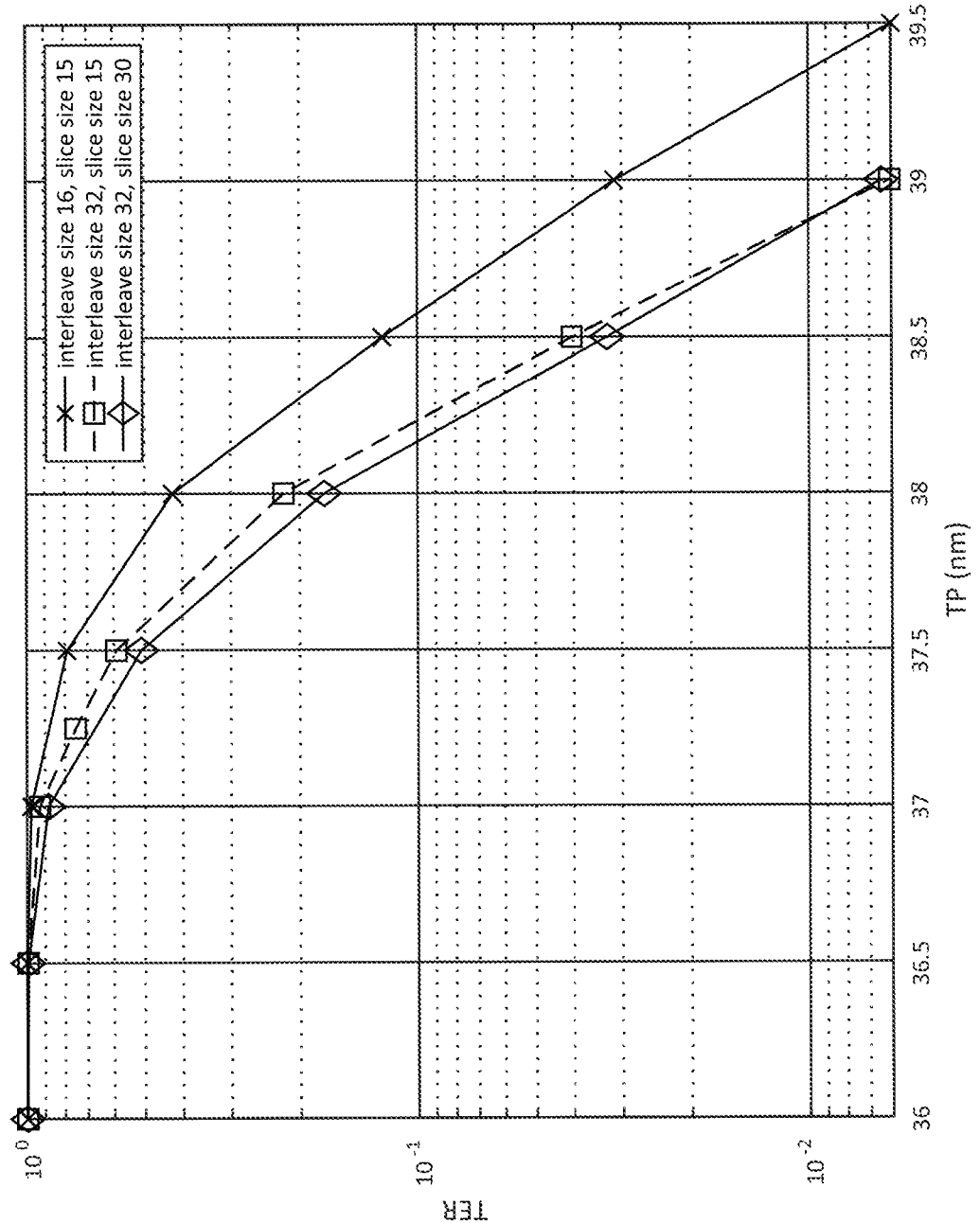
FIGS. 6 and 7 are charts showing relative performance of various interleave schemes with different slice sizes in accordance with various embodiments.

In some aspects, it can be advantageous to use a common slice size for multiple interleave sizes in different zones, especially when interleave sizes are roughly multiples of the smallest interleave size among them, as shown by the traces illustrated in FIG. 6, which shows that scheme illustrated by FIG. 5B (interleave size of 32 sectors and 15 slices per block) demonstrates substantial performance advantages, in terms of TER vs. TP, over the scheme of 5A (interleave size of 16 sectors, slice size of 15). This is to be expected given the relative sparsity of data in the scheme of FIG. 5B, as discussed above, in comparison with the scheme of FIG. 5A. In particular embodiments, different zones (with different interleave sizes) might have the same slice size. While changing slice sizes to correspond to different interleave sizes in different zones can be done in some embodiments (in order to improve the TER as much as possible), FIG. 6 illustrates that selection of a slice size that works relatively well for multiple interleave sizes can maintain acceptable performance. Moreover, attempting to use different slice sizes for different zones can result in needless complexity. Thus, other embodiments retain the same slice size for multiple zones, regardless of changing interleave sizes.

In some embodiments, a track contains various numbers of sectors, which are often not integer multiples of the nominal interleave size. Some interleaved blocks contain a few more or less sectors than the nominal interleave size, so that all sectors in the track are covered by sector interleaving. In this case, the effective or prevailing interleave size can be considered as either the average interleave size in the track, the dominant interleave size for most sectors in the track, or the interleave size with the most significant error rate performance impact in that track.

It should be recognized, of course, that these are examples of different interleave and slice sizes are provided for illustrative purposes only and should not be considered limiting. Thus, a variety of other interleave schemes (with different interleave sizes and slice sizes) fall within the scope of various embodiments.

Exemplary Implementations

Certain exemplary implementations are described below. Each of the described embodiments can be implemented separately or in any combination, as would be appreciated by one skilled in the art. Thus, no single embodiment or combination of embodiments should be considered limiting.

Some embodiments provide devices. An exemplary device might comprise circuitry (and/or other logic) to determine a first interleave size for writing data to a first zone on a hard disk drive and circuitry (and/or other logic) to determine at least one additional interleave size for writing data to at least one additional zone on the hard disk drive. The device might further comprise circuitry (and/or other logic) to configure a write head of the hard disk drive to write first data to the first zone; in an aspect, the first data might be interleaved according to the first interleave size. The device might comprise circuitry (and/or other logic) to configure the write head of the hard disk drive to write additional data to the at least one additional zone; in another aspect, the additional data might be interleaved according to the at least one additional interleave size.

In some cases, the device might be a control device, as described above, and/or any other suitable device. In such cases, the hard disk drive might comprise the device, or the device might be an external device in communication with the hard disk drive. In other cases, the device might be the hard disk drive itself.

In some embodiments, the first interleave size might be one sector, and/or the second interleave size might be greater than the first interleave size. In other embodiments, the first interleave size might be no greater than sixteen sectors. Alternatively, and/or additionally, the at least one additional interleave size might comprise one or more interleave sizes of no fewer than twenty-four sectors and no greater than forty-eight sectors.

As noted above, in some cases, the disk might have more than two zones; for instance, the at least one additional zone could comprise at least two additional zones, such as a second zone and a third zone. In such cases, the at least one additional interleave size might comprise a second interleave size and a third interleave size. In these cases, the additional data might comprise second data and third data, and the device might further comprise logic to configure the write head of the hard disk drive to write the second data to the second zone at the second interleave size and/or logic to configure the write head of the hard disk drive to write the third data to third zone at the third interleave size.

In some aspects, the second interleave zone can be outside (i.e., further from the center of the disk) than the first interleave zone on the write surface of the hard disk drive, and the third interleave zone might be outside the second interleave zone on the write surface of the hard disk drive. In other aspects, the second interleave size can be greater than the first interleave size and/or the third interleave size can be greater than the second interleave size. Thus, the at least one additional zone might comprise at least two zones. On the other hand, as noted above, embodiments are not so limited, and there may be many additional zones, each of which can have its own interleave size. Merely by want of example (and not limitation), some embodiments might have at least twenty-four additional zones.

As noted above, the first zone might comprise a region between an inner radius of a write surface of the hard disk drive and a specified radius. Accordingly, the at least one additional zone might comprise a region between the specified radius and an outer radius of the write surface of the hard disk drive. The device, in such cases, might include circuitry (or other logic) to determine the specified radius (or radii, if there are more than two zones).

In some cases, the device might comprise circuitry (or other logic) to determine at least one slice size for writing data to the hard disk drive and/or logic to configure the write head of the hard disk drive to interleave data according to the at least one slice size. As noted above, in some embodiments, the at least one slice size is a single slice size used for interleaving data written to all zones of the hard disk drive. In some embodiments the single slice size is selected to balance data sparsity across all zones of the hard disk drive. Merely by way of example, the first and second interleave sizes and the slice size can be selected so that both interleave sizes roughly correspond to multiples of the slice size.

In some cases, the device might further comprise a processor and a non-transitory computer readable medium having instructions encoded and executable by the one or more processors. In such cases, logic can comprise such instructions. Alternatively, and/or additionally, the device might comprise hardware or firmware circuitry and some or all of the logic can comprise instructions encoded in and/or executable by, the hardware or firmware circuitry with or without the cooperation of a processor (if any exist in the device).

A device in accordance with another set of embodiments might comprise a hard disk drive. In some cases, the device might be the hard disk drive itself; in other cases, the device might be another device comprising the hard disk drive, such as a vehicle, computing system, and/or the like. The device might be configured to determine a first interleave size for writing data to a first zone on the hard disk drive and/or to determine at least one additional interleave size for writing data to a at least one additional zone on the hard disk drive. Accordingly, the device might be configured to configure a write head of the hard disk drive to write first data (interleaved according to the first interleave size) to the first zone and/or configure the write head of the hard disk drive to write additional data (interleaved according to the at least one additional interleave size) to the at least one additional zone.

Figure 8:
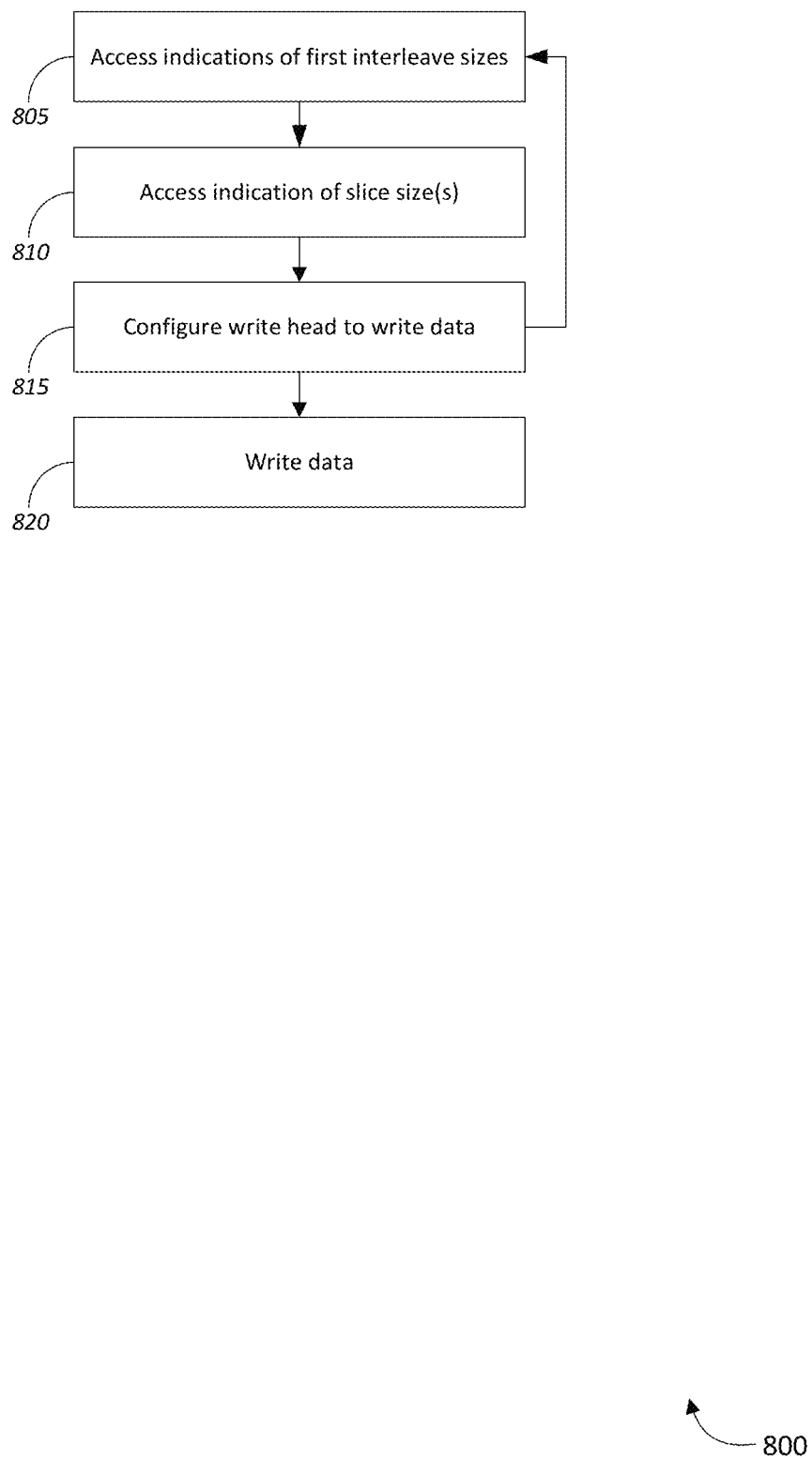
FIG. 8 is a flow diagram illustrating a method in accordance with various embodiments.

Another set of embodiments provides methods, including without limitations methods that can be performed by various devices and systems provided by other embodiments. FIG. 8 illustrates on exemplary method 800. One exemplary method comprises determining two or more interleave sizes for writing data to two or more zones of a hard disk drive (block 805). Similarly, at block 810, the method can include determining slice sizes to be used to interleave data in each zone. In some cases, the method can include determining one or more boundaries of one or more zones (e.g., one or more radii that define such boundaries).

In some cases, this might include determining a first interleave size and/or slice size for writing data to a first zone on a hard disk drive and determining at least one additional interleave size and/or slice size for writing data to a at least one additional zone on the hard disk drive. In some cases, there can be many different zones, and the method can include determining interleave and/or slice sizes for each of those zones. As noted above, some zones might have different interleave sizes and the same slice size.

Determining a value or parameter, such as a zone, a zone boundary (e.g., a radius or radii defining a zone), an interleave size for a zone, and/or a slice size, can include any operations that inform the device of such parameters so that the device can write data accordingly. Merely by way of example, a device might store, e.g., in a register, in software, or otherwise in hardware or firmware, data identifying different zones of the write surface of a disk. Such identification might indicate track numbers that are zone boundaries, radii from a center of the disk that define zone boundaries, or any other type of indication that can be used by the logic of the device to define for the write head the boundaries of each zone. The device might also store, in similar fashion, indications of the interleave size and/or slice size that should be used in each zone. This data might be stored as a table listing zone boundaries and corresponding interleave rates for each zone or using any other data structure that can enable the device to determine the interleave size to be used at any given region of the write surface. Thus, for example, in some embodiments, determining one or more of these parameters might include looking up the parameter(s) in whatever location, receiving the parameter(s) from another source, operating in accordance with these stored parameters, and/or the like.

The method can further include configuring a write head of the hard disk drive to write first data to each zone (block 815), interleaved according to the interleave size and/or slice size of that zone. For example, the method might include configuring the write head to write data to the first zone, the first data being interleaved according to the first interleave size (and or a first slice size) and configuring the write head of the hard disk drive to write additional data to the at least one additional zone, the additional data being interleaved according to the at least one additional interleave size (and/or at least one additional slice size). Configuring the write head can include instructing the write head, controlling the write head, and/or any other operation(s) that cause the write head to write the data as specified by the determined zones, interleave sizes, and/or slice sizes.

The method 800 can further comprise writing the data to each zone as specified by the configuration of the write head (block 820). Merely by way of example, the method can include writing the first data to the first zone; and writing the additional data to the zone(s). In some embodiments, the writing of data is performed in a conventional manner, except that the data is interleaved differently according to the zone in which it is written. Similarly, the slice size of the data being written may change (but need not necessarily change) in different zones, according to the configuration of the write head.

Figure 9:
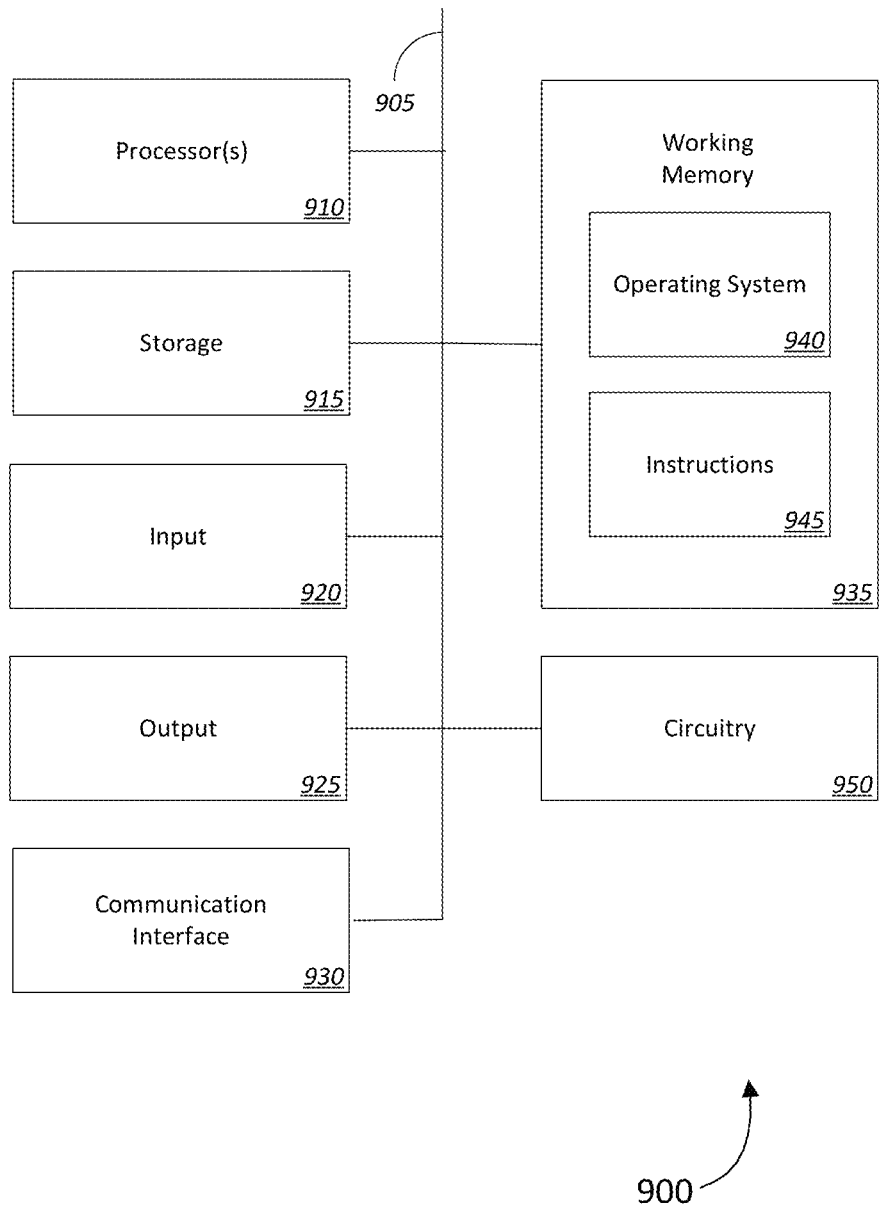
FIG. 9 is a block diagram illustrating example components of a device in accordance with various embodiments.

FIG. 9 is a block diagram illustrating an example of a device 900, which can function as described herein, including without limitation serving as a controller, microcontroller, hard disk drive, or computer system (or a component thereof) in accordance with various embodiments, and/or performance of the methods described herein. It should be noted no component shown in FIG. 9 should be considered necessary or required by each embodiment. For example, many embodiments may not include a processor and/or might be implemented entirely in hardware or firmware circuitry. Similarly, many embodiments may not include input devices, output devices, or network interfaces.

With that prelude, as shown in FIG. 9, the device 900 may include a bus 905. The bus 905 includes one or more components that enable wired and/or wireless communication among the components of the device 900. The bus 905 may couple together two or more components of FIG. 9, such as via operative coupling, communicative coupling, electronic coupling, and/or electric coupling.

The device 900 can also include a processor 910, which can include a central processing unit, a graphics processing unit, a microprocessor, a controller, a microcontroller, a digital signal processor (DSP), programmable logic (such as a field-programmable gate array (FPGA) an erasable programmable logic device (EPLD), or the like), an application-specific integrated circuit (ASIC), a system on a chip (SoC) and/or another type of processing component. The processor 910 can be implemented in hardware, firmware, or a combination of hardware, firmware and/or software. In some implementations, the processor 910 includes one or more processors capable of being programmed to perform one or more operations or processes described elsewhere herein. For example, the device 900 can include nonvolatile storage 915 for instructions (e.g., operating system, applications, object code, assembly, binary, etc.) used to program the processor 910 in this way. In some cases, the storage can be a hard disk drive in accordance with various embodiments. This storage 915 can be a nonvolatile memory, hard disk drive, etc. that stores the instructions. In a particular set of embodiments, the instructions are stored as hardware instructions, for example as encoded in hardware and/or firmware (e.g., hardware circuitry 950, discussed below).

In some embodiments, the device 900 might include input components 920 and/or output components 925. The input components 920 can enable the device 900 to receive input, such as user input and/or sensed input. For example, the input component 920 may include a touch screen, a keyboard, a keypad, a mouse, a button, a microphone, a switch, a sensor, a global positioning system sensor, an accelerometer, a gyroscope, and/or an actuator. The output component 925 can enable the device 900 to provide output, such as via a display, a speaker, and/or a light-emitting diode.

The device 900 can also include a communication interface 930, which can enable the device 900 to communicate with other devices via a wired (electrical and/or optical) connection and/or a wireless connection. For example, the communication interface 960 may include a receiver, a transmitter, a transceiver, a modem, a network interface card, and/or an antenna. In some cases, the communication interface 930 might comprise a plurality of I/O ports, each of which can be any facility that provides communication between the device 900 and other devices, in particular embodiments, such ports can network ports, such as Ethernet ports, fiber ports, etc. Other embodiments can include different types of I/O ports, such as serial ports, pinouts, and/or the like.

In some embodiments, the device 900 can comprise logic. Such logic can be any sort of code, instructions, circuitry, or the like that can cause the device 900 to operate in accordance with the embodiments herein (e.g., to perform some or all of the processes and/or operations described herein). Merely by way of example, the device 900 can include a working memory 935, into which can be loaded (e.g., from storage 915) an operating system 940 and/or other instructions 945 (e.g., to perform the operations and methods described herein). In some implementations, execution of the instructions 945, by one or more processors 910, causes the one or more processors 910 and/or the device 900 to perform such operations.

Alternatively, and/or additionally, logic can include circuitry 950 (e.g., hardware or firmware), which can operate independently of, or collaboratively with, any processor 910 the device 900 might or might not have. (As noted above, in some cases, the circuitry 950 itself might be considered a processor 910.) In such cases, some or all of the logic enabling or causing the performance of some, or all, of the operations described herein might be encoded in hardware or firmware circuitry (e.g., circuitry 950) and executed directly by such circuitry, rather than being loaded into working memory 935 and run by the processor 910. Thus, unless the context dictates otherwise, embodiments described herein are not limited to any specific combination of hardware, firmware, and/or software.

CONCLUSION

In the foregoing description, for the purposes of explanation, numerous details are set forth to provide a thorough understanding of the described embodiments. It will be apparent to one skilled in the art, however, that other embodiments may be practiced without some of these details. In other instances, structures and devices are shown in block diagram form without full detail for the sake of clarity. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Thus, the foregoing description provides illustration and description of some features and aspect of various embodiments, but it is not intended to be exhaustive or to limit the implementations to the precise form disclosed. One skilled in the art will recognize that modifications may be made in light of the above disclosure or may be acquired from practice of the implementations, all of which can fall within the scope of various embodiments. For example, as noted above, the methods and processes described herein may be implemented using software components, firmware and/or hardware components, (including without limitation processors, other hardware circuitry, custom integrated circuits (ICs), programmable logic, etc.) and/or any combination thereof.

Further, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Likewise, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods does not limit the implementations unless specifically recited in the claims below. Thus, when the operation and behavior of the systems and/or methods are described herein without reference to specific software code, one skilled in the art would understand that software and hardware can be used to implement the systems and/or methods based on the description herein.

In this disclosure, when an element is referred to herein as being "connected" or "coupled" to another element, it is to be understood that one element can be directly connected to the other element or have intervening elements present between the elements. In contrast, when an element is referred to as being "directly connected" or "directly coupled" to another element, it should be understood that no intervening elements are present in the "direct" connection between the elements. However, the existence of a direct connection does not preclude other connections, in which intervening elements may be present. Similarly, while the methods and processes described herein may be described in a particular order for ease of description, it should be understood that, unless the context dictates otherwise, intervening processes may take place before and/or after any portion of the described process, and, as noted above, described procedures may be reordered, added, and/or omitted in accordance with various embodiments.

In this application, the use of the singular includes the plural unless specifically stated otherwise, and use of the term "and" means "and/or" unless otherwise indicated. Also, as used herein, the term "or" is intended to be inclusive when used in a series and also may be used interchangeably with "and/or," unless explicitly stated otherwise (e.g., if used in combination with "either" or "only one of"). Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

Unless otherwise indicated, all numbers used herein to express quantities, dimensions, and so forth should be understood as being modified in all instances by the term "about." As used herein, the articles "a" and "an" are intended to include one or more items and may be used interchangeably with "one or more." Similarly, as used herein, the article "the" is intended to include one or more items referenced in connection with the article "the" and may be used interchangeably with "the one or more." As used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. In the foregoing description, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Thus, while each dependent claim listed below may directly depend on only one claim, the disclosure of various implementations includes each dependent claim in combination with every other claim in the claim set. No element, act, or instruction used herein should be construed as critical or essential unless explicitly described as such.

The invention claimed is:

1. A device, comprising:
   circuitry to determine a first interleave size for writing data to a first zone on a hard disk drive;
   circuitry to determine least one additional interleave size for writing data to at least one additional zone on the hard disk drive, the at least one additional interleave size comprising a second interleave size different from the first interleave size, and the at least one additional zone comprising a second zone different than the first zone;
   circuitry to configure a write head of the hard disk drive to write first data to the first zone, the first data being interleaved according to the first interleave size; and
   circuitry to configure the write head of the hard disk drive to write second data to the second zone, the second data being interleaved according to the second interleave size.

2. The device of claim 1, wherein the device is a system on a chip (SoC).

3. The device of claim 1, wherein the hard disk drive comprises the device.

4. The device of claim 1, wherein the first interleave size is one sector.

5. The device of claim 1, wherein the second interleave size is greater than the first interleave size.

6. The device of claim 1, wherein the first interleave size is no greater than sixteen sectors.

7. The device of claim 1, wherein the at least one additional interleave size comprises an interleave size of no fewer than twenty-four sectors and no greater than forty-eight sectors.

8. The device of claim 1, wherein:
   the at least one additional zone further comprises a third zone;
   the at least one additional interleave size further comprises a third interleave size;
   the device further comprises:
      circuitry to configure the write head of the hard disk drive to write third data to the third zone at the third interleave size.

9. The device of claim 8, wherein:
   the second interleave zone is outside the first interleave zone on a write surface of the hard disk drive;
   the third interleave zone is outside the second interleave zone on a write surface of the hard disk drive;
   the second interleave size is greater than the first interleave size; and
   the third interleave size is greater than the second interleave size.

10. The device of claim 1, wherein the at least one additional zone comprises at least twenty-four zones.

11. The device of claim 1, wherein the first zone comprises a region between an inner radius of a write surface of the hard disk drive and a specified radius, and wherein the at least one additional zone comprises a region between the specified radius and an outer radius of the write surface of the hard disk drive.

12. The device of claim 11, further comprising circuitry to determine the specified radius.

13. The device of claim 1, further comprising:
   circuitry to determine at least one slice size for writing data to the hard disk drive; and
   circuitry to configure the write head of the hard disk drive to interleave data according to the at least one slice size.

14. The device of claim 13, wherein the at least one slice size is a single slice size for interleaving data written to multiple zones of the hard disk drive with different interleave sizes.

15. The device of claim 14, wherein the single slice size is selected to balance data sparsity across multiple zones of the hard disk drive with different interleave sizes.

16. A device comprising a hard disk drive, the hard disk drive configured to:
   determine a first interleave size for writing data to a first zone on the hard disk drive;
   determine at least one additional interleave size for writing data to at least one additional zone on the hard disk drive, the at least one additional interleave 5 size comprising a second interleave size different from the first interleave size, and the at least one additional zone comprising a second zone different than the first zone;

configure a write head of the hard disk drive to write first data to the first zone, the first data being interleaved according to the first interleave size; and configure the write head of the hard disk drive to write second data to the second zone, the second data being interleaved according to the second interleave size.

17. The device of claim 16, wherein the device is the hard disk drive.

18. The device of claim 16, wherein the device is a computing device.

19. A device comprising logic, the logic comprising:

logic to determine a first interleave size for writing data to a first zone on a hard disk drive;

logic to determine least one additional interleave size for writing data to at least one additional zone on the hard disk drive, the at least one additional interleave size comprising a second interleave size different from the first interleave size, and the at least one additional zone comprising a second zone different than the first zone;

logic to configure a write head of the hard disk drive to write first data to the first zone, the first data being interleaved according to the first interleave size; and logic to configure the write head of the hard disk drive to write second data to the second zone, the second data being interleaved according to the second interleave size.

20. The device of claim 19, further comprising a processor and a non-transitory computer readable medium, wherein at least some of the logic comprises instructions encoded on the non-transitory computer-readable medium and executable by the one or more processors.

* * * * *